H. W. GABBETT-FAIRFAX.
DEPERICARPING APPARATUS.
APPLICATION FILED NOV. 13, 1911.

1,051,877.

Patented Feb. 4, 1913.

2 SHEETS—SHEET 1.

Witnesses:

Inventor:
Hugh William Gabbett-Fairfax
by Frank Applerman
Atty

H. W. GABBETT-FAIRFAX.
DEPERICARPING APPARATUS.
APPLICATION FILED NOV. 13, 1911.
1,051,877.
Patented Feb. 4, 1913.
2 SHEETS—SHEET 2.
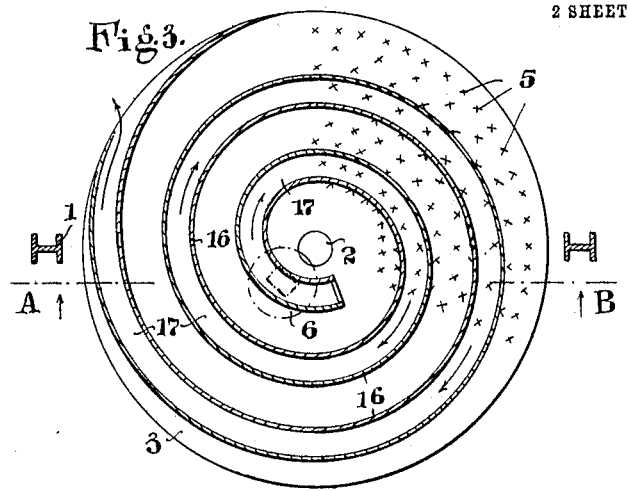
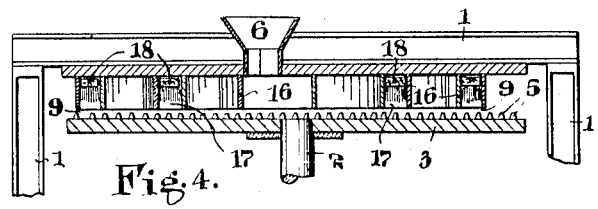

UNITED STATES PATENT OFFICE.

HUGH WILLIAM GABBETT-FAIRFAX, OF WESTMINSTER, LONDON, ENGLAND.

DEPERICARPING APPARATUS.

1,051,877.      Specification of Letters Patent.      Patented Feb. 4, 1913.

Application filed November 13, 1911. Serial No. 660,039.

*To all whom it may concern:*

Be it known that I, HUGH WILLIAM GABBETT-FAIRFAX, a citizen of the United Kingdom of Great Britain and Ireland, and resident of 78 Palace Chambers, Bridge street, Westminster, London, England, have invented certain new and useful Improvements in Depericarping Apparatus, of which the following is a specification, such as will enable others skilled in the art to which it appertains to make and use the same.

This invention relates to decorticating machines, of the type wherein the material is fed on to the surface of a rotating abrading member which effects the depericarping operation, and the husk, and depericarped material separated, and has for its object to provide an improved machine of this type for removing the pericarp or husk from palm nuts and the like, in which a highly efficient removal of the husk from the nut is effected.

According to the invention, I provide ribs or the like guiding devices for retaining the nuts or the like in a movement relative to the rotary movement of the abrading member, and also for guiding said nuts or the like across said member. In this way the nuts or the like are maintained in contact with the abrading surface for such a time as to insure an efficient depericarping operation while at the same time they are moved to a point of discharge.

The invention further comprises the particular construction, combination and arrangement of parts as hereinafter described.

The invention is shown by way of example in the accompanying drawings, in which:—

Figure 1:
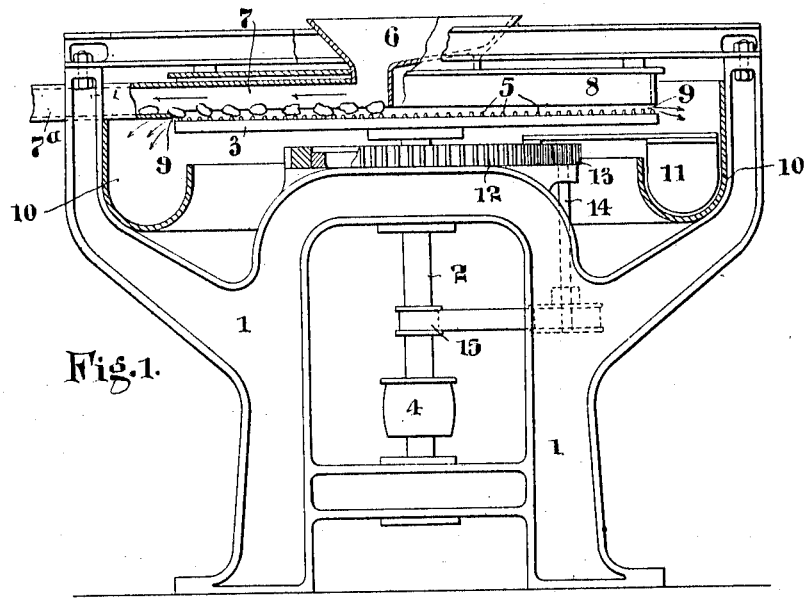
Figure 2:
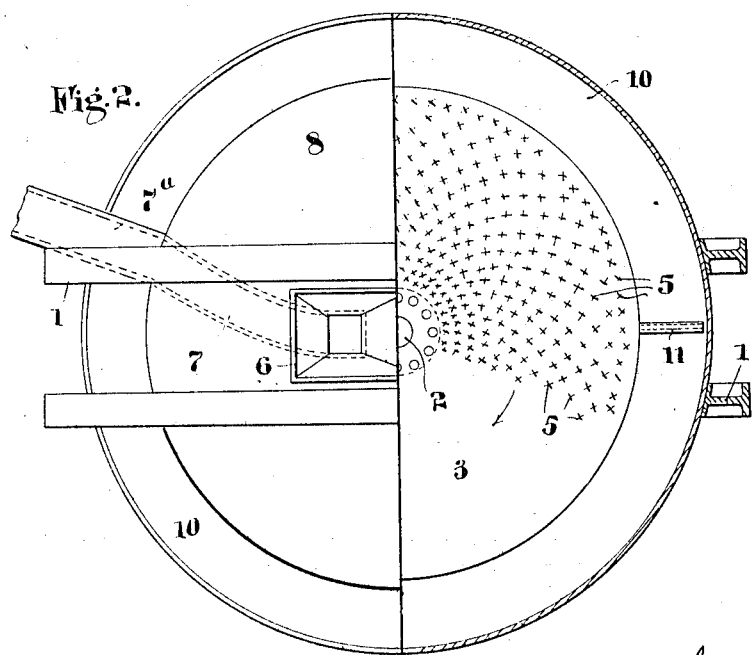

Figure 1. illustrates a machine having a rotary disk grater the drawing showing the machine in side elevation and partly in section, and Fig. 2. shows a half sectional plan of the machine shown in Fig. 1. Fig. 3. illustrates a grater of disk form, with a volute passage for the drupes. Fig. 4. is a cross sectional view of a disk and volute passage such as that shown in Fig. 3. and shows a brush-like cover to the passage.

Referring to the drawings it will be seen the machine comprises a frame 1 upon which a centrally arranged vertical spindle 2 is mounted. This spindle is rigid with the disk grater 3 and is driven by a belt (not shown) on the pulley 4. The upper surface of the grater is roughened as shown at 5 and above said grater surfaces is fixed a hopper 6 leading to the passage 7. This passage is in the form of an inverted trough and set a little distance above the grater and terminating in a tube 7ª. A stationary top plate 8 is shown covering the upper side of the grater and it will be observed that the said plate 8 has a depending flange, the lower edge of the flange being set slightly above the grater so as to leave a space 9 between the grater and flange. Beyond the periphery of the grater and somewhat below it an annular trough 10 is fixed and is adapted to be swept by blade 11 fixed to the toothed wheel or annular rack 12 co-axial with but disconnected from the vertical shaft 2. This wheel 12 is rotated comparatively slowly by the pinion 13 on spindle 14 driven by a light belt from a pulley 15 on the shaft 2.

Rotation of the pulley 4 and shaft 2 is imparted to the disk 3 in the direction shown by the arrow in Fig. 2. The drupes are then fed into the hopper 6 and passing therefrom into the passage 7 contact with the abrading surface 5 and by centrifugal action of this contact are carried along the passage to the outlet tube 7ª under grating or abrading treatment until the outlet tube is reached, the speed of the machine, and if necessary the angle or set of the passage, being varied to suit the particular drupes under treatment so as to satisfactorily remove the pericarp or husk during the travel along the passage without serious injury to the kernel. The freed husk is in small particles and is impelled radially through the opening 9 for collection in the trough 10 which is prevented from overfilling by the blade 11 sweeping through it and discharging the husks into chutes or equivalents (not shown).

Fig. 3. illustrates the application of a volute passage applied to a rotary disk substantially the same as that shown in Figs. 1 and 2, the reference numerals 1, 2, 3, 5, 9 and 6 referring to like parts but in the construction shown in Figs. 3 and 4 the volute 17 is formed by the walls 16 and the distance the drupes travel in crossing the grater is of much greater length than that in Figs. 1 and 2. The volute passage may obviously be formed by a single wall.

It will be seen in Fig. 4. that a brush 18 is arranged in the passage 17 and for the purpose of exercising resilient pressure and frictional contact on the drupes to keep them in engagement with the abrading surface 5.

What I claim and desire to secure by Letters Patent is—

A decorticating machine for removing pericarp from nuts comprising a frame, an abrading disk, a guiding member having an open bottom, the said bottom being in juxtaposition to the abrading disk, the said guiding member adapted to hold nuts into engagement with the abrading disk, a tubular member on one end of the guiding member, the tubular member being spaced from the abrading disk, the husks of the nuts adapted to be ejected through the space between the tubular member and the abrading disk, and means for rotating the abrading disk.

In witness whereof I have hereunto set my hand in presence of two witnesses.

HUGH WILLIAM GABBETT-FAIRFAX.

Witnesses:
  W. C. TOWLES,
  W. I. SKERTEN.

---

Copies of this patent may be obtained for five cents each, by addressing the "Commissioner of Patents, Washington, D. C."